(12) United States Patent
Lepp et al.

(10) Patent No.: US 8,210,342 B2
(45) Date of Patent: Jul. 3, 2012

(54) SWEEP AUGER ELEVATOR DRIVE WHEEL

(76) Inventors: Henry Peter Lepp, Winnipeg (CA);
Herman Peter Lepp, Brandon (CA);
Frans Van Meijl, Rapid City (CA);
Ronald Gordon Routledge, Hamiota (CA)

(*) Notice: Subject to any disclaimer, the term of this patent is extended or adjusted under 35 U.S.C. 154(b) by 799 days.

(21) Appl. No.: 11/137,556

(22) Filed: May 26, 2005

(65) Prior Publication Data
US 2006/0269383 A1    Nov. 30, 2006

(51) Int. Cl.
*A01F 12/30*    (2006.01)
(52) U.S. Cl. ......................................................... 198/801
(58) Field of Classification Search ............. 198/781.07, 198/801, 803.13, 797
See application file for complete search history.

(56) References Cited

U.S. PATENT DOCUMENTS

| | | | |
|---|---|---|---|
| 3,057,522 A | 10/1962 | Reed | |
| 3,131,772 A * | 5/1964 | Town | 416/111 |
| 3,151,749 A | 10/1964 | Long | |
| 2,711,814 A | 6/1965 | McCarthy | |
| 3,368,703 A | 2/1968 | Lusk | |
| 4,172,500 A * | 10/1979 | Smith | 171/101 |
| 4,248,538 A | 2/1981 | Sukup | |
| 4,336,650 A * | 6/1982 | Gorter | 30/34.2 |
| 4,341,062 A * | 7/1982 | Scudder | 56/330 |
| 4,701,093 A | 10/1987 | Meyer | |
| 4,846,337 A * | 7/1989 | Kuhlmann | 198/475.1 |
| 4,875,820 A | 10/1989 | Lepp et al. | |
| 5,141,128 A * | 8/1992 | Pippin | 221/84 |
| 5,482,508 A | 1/1996 | Redekop et al. | |
| 5,560,473 A * | 10/1996 | Ivancso et al. | 198/803.11 |
| 5,639,200 A | 6/1997 | Jiskoot | |
| 6,238,286 B1 * | 5/2001 | Aubry et al. | 460/111 |
| 6,251,009 B1 * | 6/2001 | Grywacheski et al. | 460/112 |
| 6,945,380 B2 * | 9/2005 | Sauer | 198/339.1 |
| 7,025,555 B2 * | 4/2006 | Hanig | 414/326 |
| 7,331,855 B2 * | 2/2008 | Johnson et al. | 460/112 |
| 2004/0228711 A1 | 11/2004 | Hanig | |

OTHER PUBLICATIONS http://www.consumer.philips.com/consumer/catalog/tree/en/us/norelco/mens_grooming_gr_us_norelco/men_dryrazors_ca_us_norelco/ce/dry_razors?proxybuster=3Q0GT5F4BBCJFJORMRCSHQFHKFSESI5P.*

* cited by examiner

*Primary Examiner* — Douglas Hess

(57) ABSTRACT

A terminal elevator drive wheel for a grain bin sweep auger has angled spaced peripheral inward extending blades, which break up compacted grain, drive the auger forward, and pass the grain through an attached elevator housing over a deflector plate to the sweep auger flighting. A reduction drivebox with three double reduction sprocket and chain drives, rotate a drive sprocket axially engaging and rotating the elevator wheel.

7 Claims, 4 Drawing Sheets

SWEEP AUGER ELEVATOR DRIVE WHEEL

FIELD OF THE INVENTION

This invention relates to sweep auger elevator drive wheels in the general field of granule conveyors, which are used to move bulk granules substances, often grains such as but not restricted to wheat, oats, rye, barley, shelled or ground corn. Other grains and granules of similar type and size can be similarly moved. Such conveyors are often used in agriculture, especially in stock or poultry raising to supply grain from storage means, such as granaries, storage bins, or silos. Such storage means conventionally have discharge means. The storage means has typically a hollow cylindrical form at its base with a central sump recess forming an outlet opening for a discharge sleeve, pipe, tube, or trough. This sleeve extends under the base to a discharge port outside the base side wall, for access and collection of discharged material. A conveyor is present in the sleeve, generally an auger or screw conveyor, driven by a motor outside the side wall, such conveyors are shown in U.S. Pat. Nos. 3,057,522 to Reed, Oct. 9, 1962 and 3,151,749 to Long, Oct. 6, 1964.

When storage means are emptied, first gravity feeds the granules into the outlet opening, leaving a substantial residue forming an inverted cone outward from the opening at the angle of rest of the material often 30° or 35°, but sometimes more and sometimes less depending on material. Sweep means are used to convey this residue to the opening, originally human, today more often a sweep conveyor, which is generally radially disposed and movable about the opening to sweep the granules towards the opening. Conventionally this conveyor is an auger, such as shown in U.S. Pat. Nos. 2,711,814 to McCarthy, Jun. 28, 1955, 3,151,749 to Long, Oct. 6, 1964. A double sweep auger is shown in U.S. Pat. No. 3,368,703, to Lusk, Feb. 13, 1968, designed for use in both loading and unloading the storage bin, and free floating rather than fixed to a rotational axis.

Sweep and discharge conveyors, often augers, may have the same or separate drive means. When the drive means are the same, the discharge conveyor drives the sweep conveyor through gearing means, usually there is a clutch arrangement to engage or disengage the sweep conveyor from the gearing means. Long, above, teaches a same drive arrangement. When the drive means are separate, sweep conveyor and attached separate drive means are mounted inside the storage space. This allows the sweep conveyor and its drive means to be portable or movable and thus usable to discharge a series of storage bins or tanks. McCarthy, above, teaches a separate drive arrangement.

The drive systems need different arrangements at the central outlet opening at the inner end of the discharge sleeve. The same drive system needs space for gearing and clutch arrangements, usually in the floor of the storage means, while the separate drive system needs no such space. Thus two distinct arrangements are needed at the outlet opening of the discharge sleeve. As the floor, usually concrete, is constructed to withstand substantial pressure with the discharge sleeve set in the concrete, changing the outlet opening is difficult. Storage bins can be constructed with both outlet opening arrangements present.

BACKGROUND & PRIOR ART

Sweep augers are known. Typically they have an outer bearing wheel to support the auger and to assist in driving the auger around a cylindrical bin. Originally the wheel was mounted on the sweep auger shaft and rotated with it at the same rpm, for example U.S. Pat. No. 4,875,820, to some of applicants, Oct. 24, 1989, which also teaches a smaller wheel running on an elevated track at sweep auger rpm. This approach has problems, as a soft wheel surface providing traction wore out, while a hard surface wore out slower, but might not provide traction. Other solutions, such as a shaft coaxial in the auger shaft at reduced rpm driving a sprocket engaging a track, auxiliary motors driving wheels at reduced rpm often engaging tracks, have been tried, are all cumbersome and expensive. For example U.S. Pat. No. 4,248,538, to Sukup, Feb. 3, 1981 teaches a double flanged reduced wheel driven by a shaft running on a elevated bin track, although not specifically a solution for sweep augers, it could be adapted for them. For reasons of safety and wear, it was preferred to reduce the rpm of the wheel relative to the rpm of the auger shaft. One solution, U.S. Pat. No. 4,701,093, to Meyer, Oct. 20, 1987, teaches an off-center wheel driven by a terminal sprocket on a sweep auger shaft, engaging a sprocket chain internal to the wheel periphery. U.S. Pat. No. 5,639,200, to Jiskoot, Jun. 17, 1997 teaches a drive wheel behind the sweep auger. The auger shaft turns a small sprocket and chain engaging a larger driven sprocket above and outside the auger outer end. A shaft from the larger sprocket bears an eccentric disc, which has a bearing band with an attached bar engaging a ratchet wheel mounted coaxially with the drive wheel, advances ratchet and drive wheel with rotation of the larger sprocket. A pivot arm also engages the ratchet and prevents retrograde movement of the drive wheel. Applicant in 2000 invented built and sold a reduction drivebox specifically designed to drive a wheel, at the outer end of the auger, roughly the same diameter as the auger. The drivebox is between the auger and the wheel, which is axially aligned with the auger shaft. U.S. pat. appln. Ser. No. 2004/0228711, to Hanig, Nov. 18, 2004 teaches the auger shaft turning a small sprocket engaging a chain driving a large sprocket which turns a small terminal sprocket engaging a sprocket chain internal to the wheel periphery. Essentially Hanig adds a reduction sprocket and chain to Meyer. A drawback is that the wheel by itself can neither move through compacted grain nor move it to the auger. The auger itself cannot remove compacted grain in front of the wheel. The situation is worsened by any space or gap between wheel and auger flighting end, which in practice is impossible to avoid, although it can be minimised. In general all sweep augers tend to jam once in a while in compacted grain. The operator will then enter the bin and kick or shove the auger, sometimes using a lever, occasionally this results in deleterious operator-auger interaction.

A principal object of the invention is to provide a sweep auger drive wheel having peripheral blades, which agitates granules at the outer edge of the storage bin in front of the drive wheel.

The blades simultaneously provide contact with the floor of the storage bin, and propel the auger forward into the granules. A subsidiary object of the invention is to provide an elevator having a housing and deflector plate adjacent, behind and associated with the drive wheel, whereby grain carried upward and rearward by the drive wheel discharges into the auger flighting via the deflector plate. Another subsidiary object of the invention is to provide a reduction transmission so that the auger drive wheel revolves considerably slower than the auger. It is a further subsidiary object of the invention to provide a drivebox containing said reduction transmission. It is a further subsidiary object to provide the elevator drive wheel as part of a sweep auger. It is a further subsidiary object to provide the elevator drive wheel to retrofit an existing sweep auger. Other objects and advantages of the present invention will become obvious to those skilled in the art, from the following specification, accompanying drawings and appended claims, and it is intended that these objects and advantages are within the scope of the present invention.

The invention is primarily directed to a drive wheel having peripheral blades to drive it wheel, break up compacted grain and move it backward. The wheel has an associated elevator housing and a reduction transmission. It will be also understood by those skilled in the art that the invention is not limited to such wheels, blades, elevators, transmissions and driveboxes.

DESCRIPTION OF THE INVENTION

The invention was developed to prevent compacted grain jamming sweep augers. As noted above a drivebox was used to rotate a drive wheel mounted directly on the outlet drive shaft of the drivebox. The first step was to place blades on the edge of the wheel pointing inward. Next the wheel was moved around the box. The drivebox formerly mounted horizontal was then made vertical and the wheel enlarged to encompass it. The elevator housing was added, and the blades were angled. The original double reduction drivebox was modified to triple by adding an extra sprocket and chain reduction gearing.

The invention in one broad aspect is directed to a sweep auger for a grain bin comprising an elevator drive wheel rotatably mounted at an outer end. The sweep auger has pivot means and drive means at an inner end, and shaft means bearing flighting means extending from the drive means to the outer end. The wheel is circular and comprises a plurality of inward directed peripheral blades. There are speed reduction transmission means for driving the elevator drive wheel in response to rotation of the auger shaft means, at an angular velocity substantially less than the angular velocity of the auger shaft. Generally the speed reduction transmission means is a drivebox having a input drive shaft directly connected to the auger shaft, and the drivebox is radially within the plurality of peripheral blades. Typically the elevator drive wheel is larger in diameter than the flighting of the auger, and has an axis of rotation above and parallel to the auger, so that the bottom of flighting and elevator drive wheel are substantially at the same level. The drivebox preferably has an outlet drive means axially engaging and rotating said elevator drive wheel. More preferably the outlet drive means is a rotatable outlet drive shaft. The outlet drive means can also be an output drive sleeve around a stationary countershaft, but this solution is less elegant and more cumbersome. Preferably the peripheral blades are angled axially from the wheel periphery with the outer end with respect to the auger leading the inner end with respect to the auger in the direction of rotation of the elevator drive wheel. The blade slopes upward from the wheel disc as it moves down into the grain, and downward from the wheel disc as it passes the deflector plate rising. Typically there is an auger backplate extending from the inner end of the auger to an end plate at the outer end of the auger comprising a elevator mounted about the drive wheel on the end plate rearward of the direction of travel of the auger. The elevator has a cylindrical elevator housing radially outward and closely adjacent the blades extending from adjacent the floor of the bin above the axis of rotation the wheel.

The elevator housing has an outer elevator end plate extending in a plane substantially perpendicular to the axis of rotation of the wheel. The elevator housing has a mounting bracket for attachment to the end plate of the auger. An inner housing end plate extends in a plane substantially perpendicular to the axis of rotation of the wheel. A deflector plate inward of the inner end plate is angled downward from the top of the elevator housing toward the auger, the deflector plate being above the auger back plate, and extending above the flighting of the auger, so that the blades carry granules up, the elevator and discharge them down the deflector plate. Preferably the auger is part of a discharge apparatus for a storage bin having a central outlet opening connecting to a discharge sleeve adapted to contain a discharge conveyor to a discharge port, the discharge conveyor having drive means outside the storage bin, the outlet means comprising mounting means to mount a sweep auger of the invention. The sweep auger may have separate sweep auger drive means, or it may have gearing means to drivably connect the sweep auger to the discharge conveyor. More preferably a storage bin will comprise the discharge apparatus described above. Preferably the drivebox comprises an input shaft directly connected to the auger shaft means driving a first small sprocket linked by a first chain to a second larger sprocket. The second sprocket is integral with a coaxial shaft bearing a third small sprocket connected by a second chain to a fourth larger sprocket. The fourth sprocket is integral with a coaxial shaft bearing a fifth smaller sprocket connected by a third chain to a sixth larger sprocket integral with rotatable outlet drive means for the elevator drive wheel. More preferably the drivebox comprises an input shaft directly connected to the auger shaft means driving a first small sprocket linked by a first chain to a second larger sprocket. The second sprocket is integral with a coaxial shaft bearing a third small sprocket connected by a second chain to a fourth larger sprocket. The fourth sprocket is integral with a coaxial shaft bearing a fifth smaller sprocket connected by a third chain to a sixth larger sprocket integral with a rotatable outlet drive sleeve axially connected to said elevator drive wheel.

In a second broad aspect the invention is directed to an elevator drive wheel for an auger comprising a flat plate having a generally circular edge and inner and outer sides with equispaced peripheral planar brackets attached to the edge of the plate on its inner side to mount blades. Preferably these brackets are at an acute angle to the circular plate, backward from the direction of rotation of the auger. Typically resilient blades are attached to the brackets. Preferably the resilient blades are attached by bolts to the brackets. More preferably the resilient blades are secured by metal plates attached by bolts to the brackets.

DESCRIPTION OF THE PREFERRED EMBODIMENTS

Figure 1:
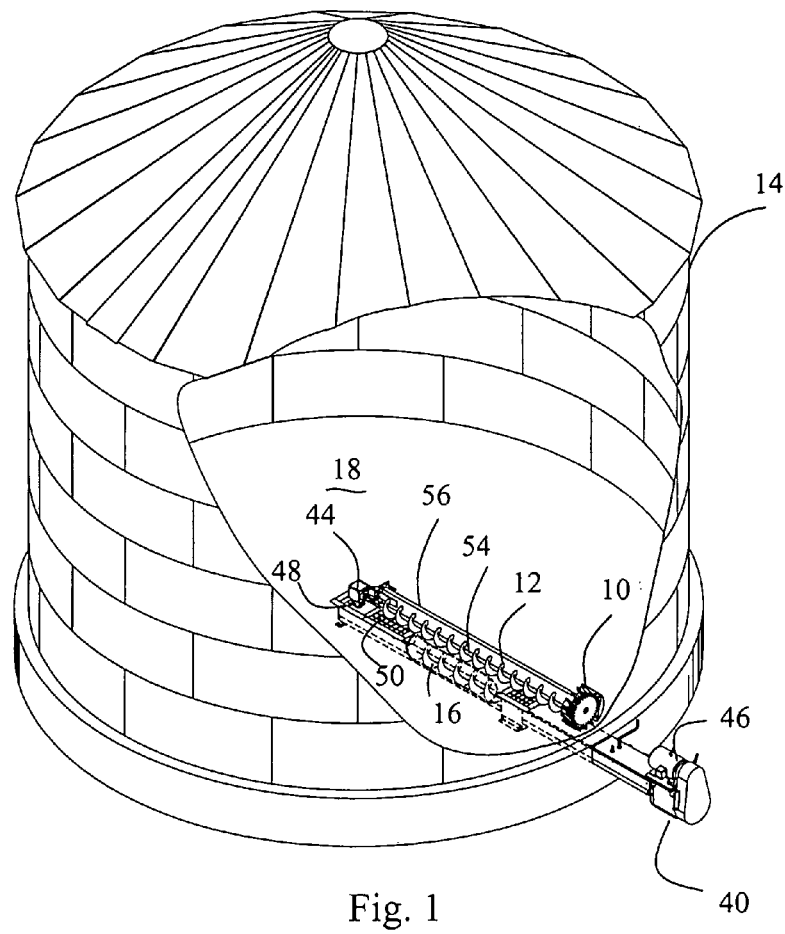
FIG. 1 shows a perspective view of an elevator drive wheel of the invention mounted on a sweep auger in a grain bin.
Figure 2:
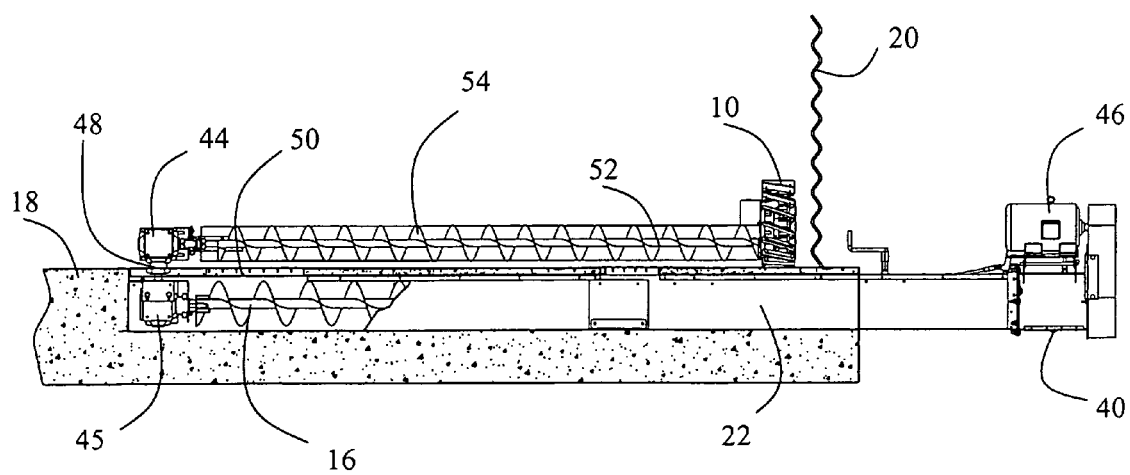
FIG. 2 shows a part sectional side elevational view of the embodiment of FIG. 1.
Figure 3:
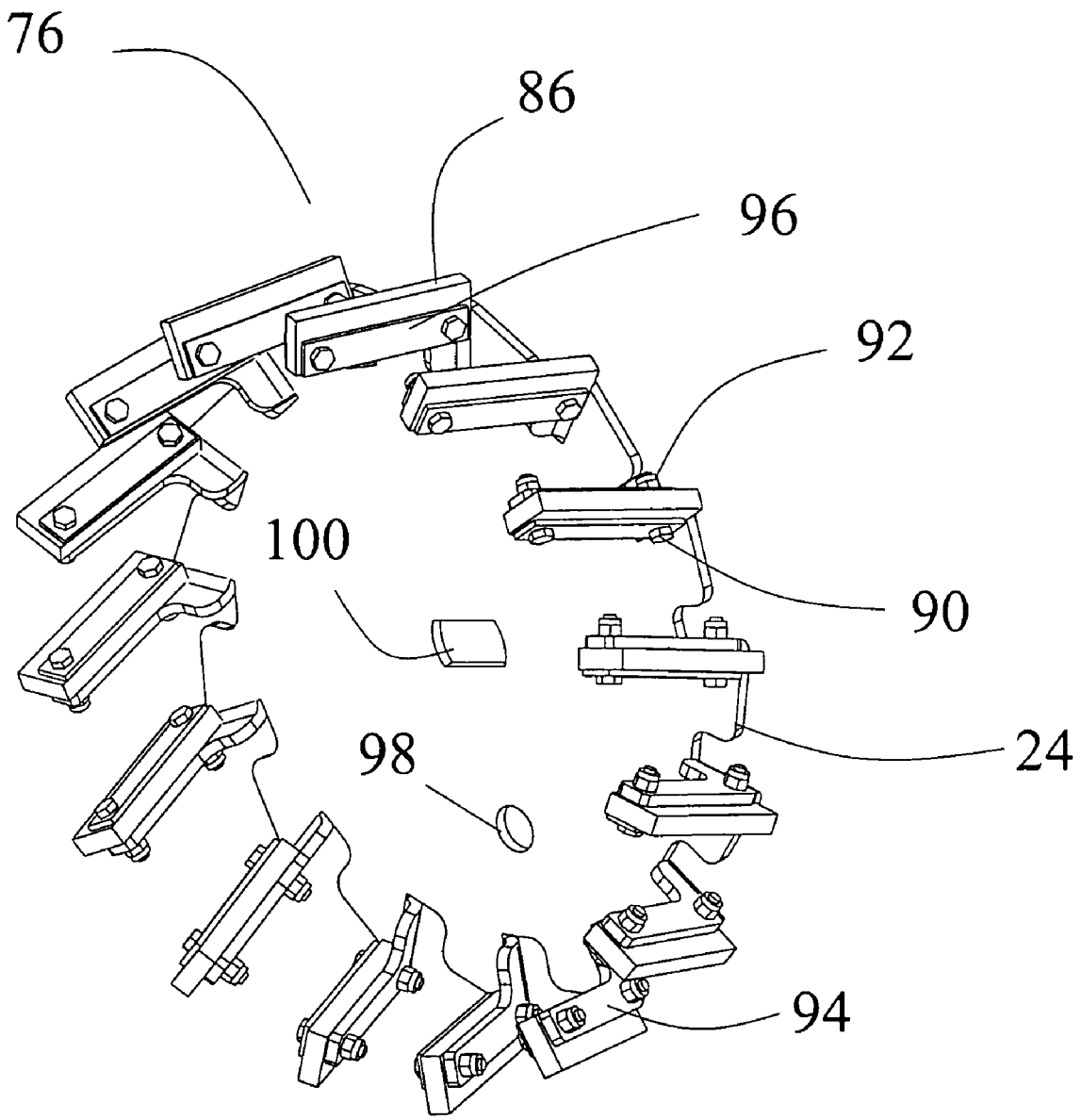
FIG. 3 shows a perspective view of a drive wheel of the invention.

The invention is now illustrated by reference to preferred embodiments. As shown in FIGS. 1 and 2, numeral 10 indicates an elevator drive wheel assembly of the invention shown attached at the outer end of sweep auger 12, in grain bin 14. Sweep auger 12 has shaft 52, flighting 54 and back plate 56 which acts as a channel to move the grain toward outlet opening 48, and down discharge auger inlet 50, and is centrally rotatably mounted and rotatably driven by driveboxes 44 top and 45 bottom through central floor outlet opening 48 in typically concrete bin floor 18. Grain bins come in assorted diameters, each with associated radius sweep augers, as understood by those skilled in the art. Sweep auger 12 moves grain-to outlet opening 48, where it is removed by stationary unload auger 16 in floor trough 22 driven by (electric) motor 46 to discharge 40. Generally the outer end of elevator drive wheel assembly 10 is close to bin wall 20, usually closer than shown in FIG. 2, a clearance of around 3 inches (7½ cm) is typical. As shown in FIG. 3 elevator drive wheel 76 has wheel disc 24, typically 14¾ inch (37½ cm) diameter, and ¼ inch (about 6 mm) thick, on which are fifteen blade supports 94, ¼×¾×4 inch (about 6 mm×2 cm×10 cm) shown as integral to wheel disc 24, but which may be welded instead to the rim of disc 24, each with rubber blade 86, 7/16×1¼×4½ inch (about 1×3×11½ cm) angled at 20°.

Figure 5:
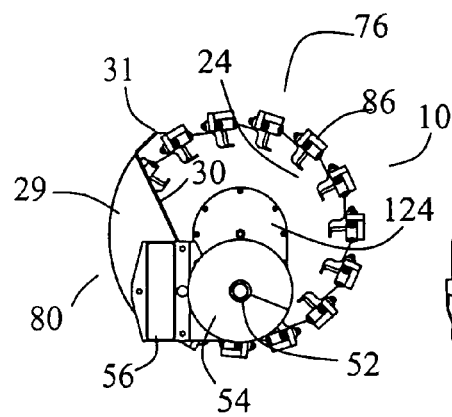
FIG. 5 shows an end partial sectional view of the embodiment of FIG. 4.
Figure 4:
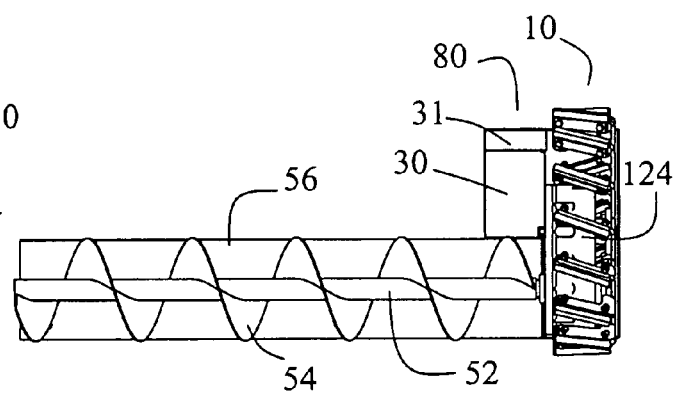
FIG. 4 shows a side elevational view of a sweep auger of the invention.
Figure 6:
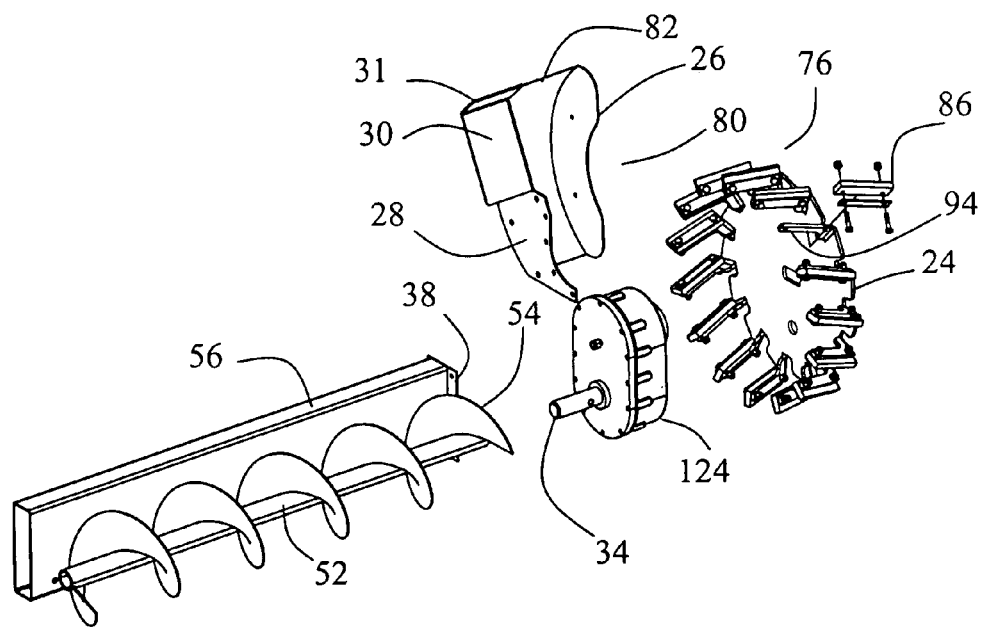
FIG. 6 shows an exploded perspective view of the embodiment of FIG. 4.
Figure 7:
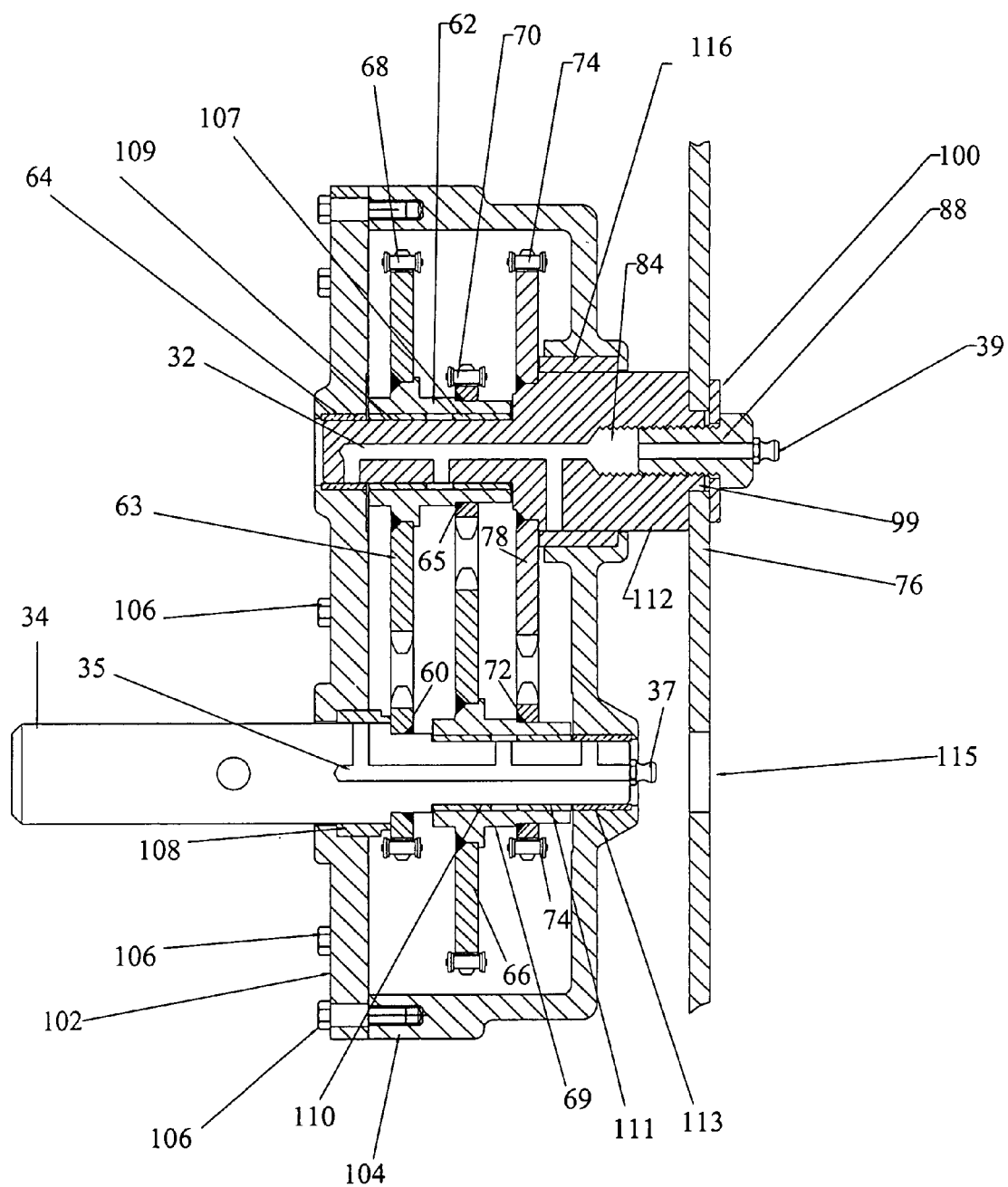
FIG. 7 shows a vertical side elevational sectional view of a drivebox of the embodiment of FIG. 4.

Blades 86 are attached by bolts 90 and nuts 92 and face plates 96 for easy replacement. Blade supports 94 project ¾ inch (2 cm) beyond the rim of disc 24, while blades 86 project 1⅛ or 1¼ inch (about 3 cm). Wheel 76 with disc 24 and blades 86 is around 17½ inch (44½ cm) diameter. Although disc 24 and supports 94, are described as integral, in fact cut from a single plate, they can be cast of unitary of cast iron, or made from separate mild steel elements. Disc 24 has slot 100 to secure wheel 76 to output drive shaft 112 of reducer drivebox 124, aperture 115 allows access to grease zerk 37. As shown in FIGS. 4, 5 and 6, elevator drive wheel assembly 10 comprises reducer drivebox 124, elevator drive wheel 76 and elevator 80. Reducer drivebox 124 has drive shaft 34 linked to auger shaft 52. Elevator 80 has housing 82 with outer end plate 26, mounting bracket 28 and deflector plate 30. Housing 82 and end plate 26 are 16 gauge mild steel, while deflector plate 30 is 14 gauge, bracket 28 is 10 or 12 gauge, the upper continuation of bracket 28 is inner elevator end plate 29. Optional upward extension 31 (14 gauge) of deflector plate 30 is tangential to housing 82, and extends about 2 inch (5 cm) and may be either welded or integral with plate 30. Housing 82 is extended to match extension 31 when present. Housing 82 has a clearance from the outer radial edges of blades 86 of around ¼ to ½ inch (½ to 1¼ cm), with about ¼ inch preferred, less clearance such as ⅛ inch (3 mm) is too small and could cause jamming or clogging of grain. Housing 82 has a radius of about 9⅛ inch (23¼ cm). Elevator drive wheel 76 mounts on shaft 112 by bolt 88 threaded into bolt hole 84. In use wheel 76 rotates carrying grain up elevator 80, grain slides down blades 86 and falls out over deflector plate 30 into auger flighting 54. When assembled reduction drivebox 124 is attached to mounting bracket 28, itself attached to auger end plate 38. Drivebox 124 has drivebox housing cover 102 secured to drivebox housing 104 by bolts 106, input drive shaft 34 has grease channel 35 accessible by grease zerk 37. Drive shaft 34 is journalled in brass bushing 108 pressed into housing cover 102, rotating integral twelve tooth sprocket 60 which drives chain 68 which rotates thirty tooth sprocket 63 part of double sprocket 62 the other sprocket being twelve tooth sprocket 65. Double sprocket 62 has pressed brass bushings 107 and 109 rotating about output drive shaft 112, which has grease channel 32 accessible by grease zerk 39. Sprocket 65 drives chain 70 engaging thirty tooth sprocket 66 part of double sprocket 69 the other sprocket being twelve tooth sprocket 72. Sprocket 69 has pressed brass bushings 110 and 111 in which rotates drive shaft 34. The end of drive shaft 34 is journalled in brass bushing 113 pressed into housing 104. Sprocket 72 drives chain 74 which engages thirty tooth sprocket 78 which is integral to output shaft 112 which has bolt socket 84 to engage drive wheel 76. Output shaft 112 has outer brass bushing 116 pressed into housing 104. Output shaft 112 ends in drive lug 99 which snugly engages slot 98 in wheel 76. Bolt 88 and washer 100 secure wheel disc 24 to output shaft 112. Double sprockets 62 and 69 are identical in dimension. Although described as integral sprockets 60, 63, 65, 66, 72, and 78 are in fact separate and welded to drive shaft 34, the sleeve of double sprocket 62, the sleeve of double sprocket 69 and output shaft 112. The numerate will realise that drivebox 124 reduces speed in three stages each 2½:1, or 15⅝:1 overall. Those skilled in the art will appreciate that variation in sprocket details can produce similar but equally effective reduction ratios. Those skilled in the art will also appreciate that other reduction gearing solutions other than sprocket chain arrangements can be substituted therefore, such as for instance a double or four times reduction gearbox, to conserve direction of rotation. Unless otherwise indicated all parts are generally steel of suitable grades, as routinely determined by those skilled in the art, although as noted wheel disc 24 and blade brackets 94 may be unitary of cast iron. Rubber or similar wearing material is used for the blades as a wearing medium to prevent damage to the wheel and the concrete floor. Typically augers range from ¼ to 9 inches (about 19 to 23 cm) actual flighting diameter, which rotate at about 250 to 300 rpm, which the reduction transmission reduces to 16 to 19 rpm, for the wheel itself. Larger augers 16 inch (about 41 cm) diameter which run at around 100 rpm, could be fitted with a modified larger wheel. Smaller augers 5⅜ inch (about 14 cm) diameter could also be fitted with a modified smaller wheel.

Several versions were built and tested, one had a 3/16 inch (about ½ cm) thick wheel with thirty blades. A second version also 3/16 inch (½ cm) thick was tested with about 1 inch (2½ cm) bin wall clearance, which was found too close, 2 or 3 inches (5 to 7½ cm) being preferred, while 3/16 inch (½ cm) thickness was considered too thin. A third version with a ⅜ inch (1 cm) thick wheel had the blades extending about 1 inch (2½ cm) outward of the wheel, which was found not to pick up the grain between wheel and housing. A fourth version had the wheel close to the outer elevator end plate, with no blades extending outward, this version was then modified by adding deflector plate and elevator housing extensions, which improved grain movement through the elevator. This last version was further improved by replacing the earlier two stage reduction drivebox with the current three stage reduction drivebox. The wheel thickness in this version was ¼ inch (about 6 mm), although as shown above thickness can be varied.

As those skilled in the art are aware there are many types of transmission incorporating reduction transmission available. In practice given the requirements of the auger-wheel situation only some of these are practical solutions as would be appreciated by those skilled in the art.

As those skilled in the art would realize these preferred described details and materials and components can be subjected to substantial variation, modification, change, alteration, and substitution without affecting or modifying the function of the described embodiments. Although embodiments of the invention have been described above, it is not limited thereto, and it will be apparent to persons skilled in the art that numerous modifications and variations form part of the present invention insofar as they do not depart from the spirit, nature and scope of the claimed and described invention.

We claim:

1. Elevator drive wheel for auger comprising a flat circular plate having a generally circular perimeter and inner and outer sides with equispaced peripheral planar brackets fixedly attached at the perimeter of said circular plate on its inner side to mount blades, said circular plate being rotatable about a central axis of rotation, generally perpendicular to said plate, and having central attachment means for a drive axle, said brackets having outer edges coincident with a right cylinder extending inward from said perimeter of said circular plate, said right cylinder having an axis of rotation of said cylinder perpendicular to the center of said circular plate.

2. Elevator drive wheel of claim 1, wherein said brackets are at an acute angle to said circular plate, backward from the direction of rotation of said auger.

3. Elevator drive wheel of claim 1 wherein resilient blades are attached to said brackets, said blades having outer edges coincident with a right cylinder concentric with and of greater radius than said perimeter of said circular plate, said right cylinder having an axis of rotation of said cylinder perpendicular to the center of said circular plate.

4. Elevator drive wheel of claim 1, wherein said brackets are integral to said circular plate.

5. Elevator drive wheel of claim 4, wherein said brackets are at an acute angle to said circular plate, backward from the direction of rotation of said auger, and have resilient blades attached thereto.

6. Elevator drive wheel of claim 5, wherein said resilient blades are attached by bolts to said brackets, said blades having outer edges coincident with a right cylinder concentric with and of greater radius than said perimeter of said circular plate, said right cylinder having an axis of rotation of said cylinder perpendicular to the center of said circular plate.

7. Elevator drive wheel of claim 6, wherein said resilient blades are secured by metal plates attached by bolts to said brackets.

\* \* \* \* \*